March 20, 1962  E. P. VAN SCIVER  3,026,400
ELECTRIC APPLIANCE
Filed March 2, 1959

INVENTOR.
EDWIN P. VAN SCIVER
BY
ATTORNEY

United States Patent Office 3,026,400
Patented Mar. 20, 1962

3,026,400
ELECTRIC APPLIANCE
Edwin P. Van Sciver, Philadelphia, Pa., assignor, by mesne assignments, to Philco Corporation, Philadelphia, Pa., a corporation of Delaware
Filed Mar. 2, 1959, Ser. No. 796,593
5 Claims. (Cl. 219—35)

The present invention relates to electric appliances and more specifically to electrically operated apparatus for cooking food. While of broader application, the invention is especially useful in portable cookers for domestic use and of the type particularly adapted for barbecuing foods, such as poultry and meats.

In cookers of the above mentioned type, it has been customary to use comparatively small individual heaters within the cooking chamber. However, such heaters generally result in objectionably high temperatures at localized portions of the cooking chamber and necessitate rotation of food with respect to the heaters, in order to assure thorough and uniform roasting or broiling during the barbecuing process.

It is therefore a primary object of this invention to overcome the above noted objections by providing an electrically operable barbecuing-type cooker incorporating novel heater construction which makes it unnecessary to rotate the food in order to effect proper barbecuing thereof.

Another object of the invention resides in the provision of an improved cooker wherein roasting and browning of the food is accomplished by supporting the food so as to be peripherally exposed to radiant heat emitted by heat generating means which surrounds the supported food.

The invention is particularly characterized by the fact that the cooking chamber is constituted by an enclosure-defining member which is provided with means for generating heat and is adapted to radiate and apply the generated heat directly onto the food supported within the cooking chamber.

Toward realization of the above mentioned general objects and characteristic features, the present invention employs a hollow structure which serves to define the oven or chamber for the food to be cooked, said structure incorporating the heat-generating means which functions to cook the food. In practice, the invention utilizes a tubular body providing a cylindrically shaped oven or cooking chamber, the circumferential wall of which is provided with a coating of electrically conductive material arranged so that heat generated by said coating, converges toward a longitudinal axis of said oven or chamber, the latter enclosing means for supporting food in a position adjacent said axis. In a more specific aspect of the invention, the coating of electrically conductive material is applied on the outer cylindrical face of the oven-defining tubular body, and means for insulating said coating and for protecting against electrical shock is associated with said body.

The full nature of the invention and the manner in which the hereinabove stated and other objects and features are achieved, will be more fully understood from the following description taken in conjunction with the accompanying drawing, in which.

Figure 1:
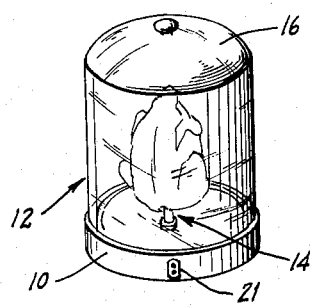
FIGURE 1 is a perspective view illustrating a preferred embodiment of a cooking apparatus constructed in accordance with the invention.

With more particular reference to the drawing, the illustrated apparatus essentially comprises a base 10, an oven-defining structure 12, a food-supporting device 14 and a cover 16.

Figure 3:
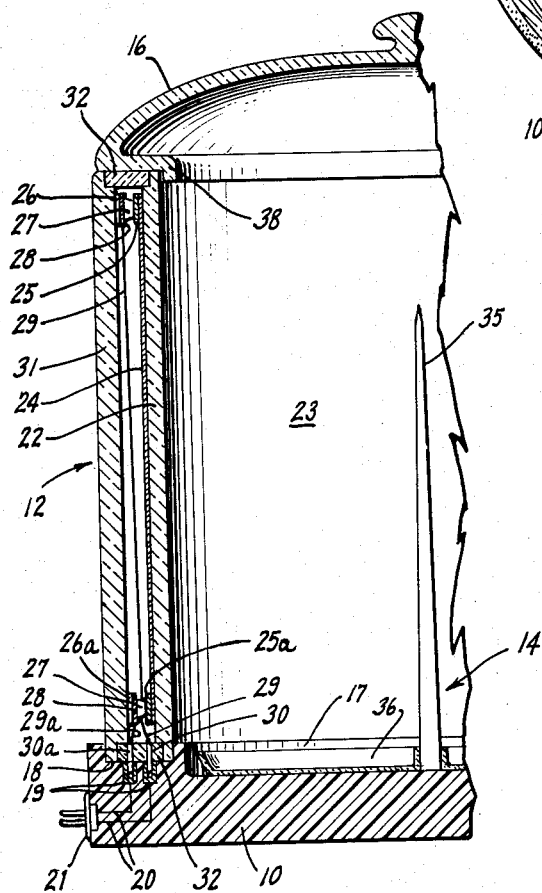
FIGURE 3 is a transverse sectional view of a portion of the apparatus illustrated in FIGURES 1 and 2.

As shown, the base 10 consists of a disc of non-conductive material, for example a suitable formaldehyde resin such as the condensation product of formaldehyde and phenol. The base is provided with a circular depression 17 and with an annular recess 18 arranged concentrically with respect to said depression. As seen in FIGURE 3, connectors 19 are mounted in the base to open into the recess 18. These connectors are linked electrically, by means of conductors 20, to a connecting plug 21 carried by the base and adapted for attachment to a customary line cord.

The structure 12 includes a shell or body 22 which, in the illustrated embodiment, has the form of a tubular member to provide a cylindrically-shaped oven or cooking chamber 23. This shell or body 22, as shown in the drawing, is constructed of non-conductive transparent material, preferably heat-resisting glass, so that the food enclosed in the oven or chamber 23 can be observed during the cooking process. Also as shown in the drawing, the oven-defining shell or body 22 is provided with heat-generating means adapted to emit and radiate heat which, as represented by arrows in FIGURE 2, converges toward the central longitudinal axis of said body 22. For that purpose, the heating means employed in the illustrated apparatus, is in the form of a coating 24 of electrically conductive material applied to the shell or body 22 and associated with a pair of flat circular conductive bands 25 and 25a which form terminals to provide for the flow of electric current through said coating. The coating 24 of electrically conductive material is preferably applied to the outer circumferential surface of the tubular body 22 and is suitably produced in known manner, by heating said surface and spraying it with tin chloride. The terminal or conductive bands 25 and 25a may be formed, also in known manner, by applying a silver metalizing compound along the marginal edge portions of the coating 24, and firing the applied composition on the glass.

Electrical connection to the coating 24 through the conductive bands 25 and 25a is accomplished by means of circuit components including a pair of conductive rings 26 and 26a each having a series of contact buttons 27, one ring 26 being connected through a conductor 29 with a prong 30 adapted for plugging engagement with one of the connectors 19 in the base 10, the other ring 26a being connected through a second conductor 29a to a second prong 30a adapted for plugging engagement with the other of said connectors 19. The conductive rings 26 and 26a are arranged to surround the cylindrical tubular body 22 and to face the conductive bands 25 and 25a, the series of contact buttons 27 being disposed on said rings to bear upon confronting portions of said bands. Good electrical contact between said buttons and bands is assured by forming the rings 26 and 26a with offset portions 28 at the places where said buttons are located. These offset portions act as springs and the contact buttons are thus resiliently urged to bear firmly upon said bands 25 and 25a.

In order to insulate the electrically conductive coating and also to protect against possible electrical shock, there is provided protective means disposed about the shell or body 22 and covering the heating means and associated circuit components.

Figure 2:
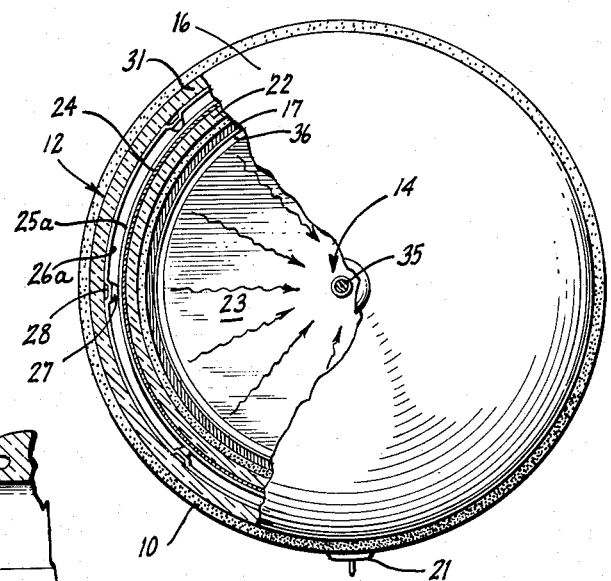
FIGURE 2 is an enlarged plan view of the apparatus illustrated in FIGURE 1 with parts broken away.

In the embodiment shown in FIGURES 2 and 3, the protective means is in the form of an auxiliary or outer shell 31 which preferably, though not necessarily, is similar in construction and configuration to the main shell or body 22. Thus, as illustrated in said FIGURES 2 and 3, the outer shell 31 consists of a tubular glass cylinder or body arranged concentrically with respect to the main or inner cylinder or body 22 and having an internal diameter sufficiently larger than the outer diameter of said inner body 22 to encompass the contact-carrying rings 26 and 26a. Suitable non-conductive members, such as circular glass elements 32 arranged about and sealed to the peripheral edges of the concentric shells or bodies 22 and 31, hermetically close the space between said shells or bodies and thus hermetically seal the electrical heating means in said space. As can be seen in FIGURE 3, the two connecting prongs 30 and 30a pass through one of the sealing elements 32 so that said prongs engage the connectors 19 when the oven-defining structure is in position within the annular recess 18 in the base 10.

Figure 4:
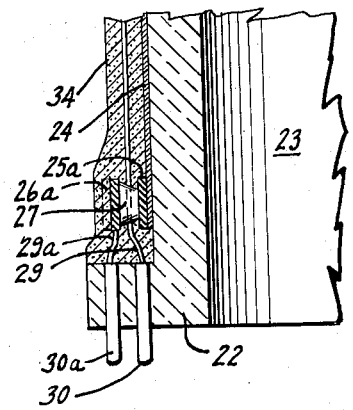
FIGURE 4 is a fragmentary sectional view, on an enlarged scale, illustrating a modified embodiment.

In the modified embodiment shown in FIGURE 4, the protective means is provided by a non-conductive heat-resisting material 34 applied over the conductive coating 24 on the glass body 22 which defines the cooking chamber 23, and over the hereinbefore mentioned circuit components associated with said coating. A material suitable for this embodiment is one that produces a plastic film having electrical and heat insulating properties, for example, one of the well known polyester or polytetrafluoroethylene products.

The food-supporting device 14 as illustrated in the drawing, comprises a spit-like member 35. This member is adapted to support the food, as represented in FIGURE 1, and is mounted in a tray-like element 36 adapted to fit within the depressed portion 17 of the base 10. In this manner the tray-like element serves to catch and hold drippings from the food supported on the spit and being cooked in the oven.

The cover 16 as shown in the drawing fits over the upper marginal edge portion of the oven-defining structure to close the oven or cooking chamber. As illustrated the cover is preferably made of transparent material such as heat resisting glass, although the cover could be made of other suitable material. Also as best seen in FIGURE 3 the cover has a flange 38 adapted to rest upon the upper peripheral edge of the oven-defining structure to locate the cover and to provide a seal for the cooking area.

From the foregoing description it will be appreciated that food supported in a cooking apparatus constructed in accordance with the present invention, need not be rotated to insure proper barbecuing. This is due to the fact that the heat generating means surrounds the supported food and that the generated heat radiates all around said food and is applied directly thereto. It is to be understood that the invention is not limited to the specific structural details herein shown and described. Particularly, it will be recognized that certain parts of the apparatus which have been shown and described as separate and individual elements, can be joined together to form integral units. For example: the cover could be made as an integral part of the oven-defining structure; or the oven-defining structure, the food-supporting device and the base could form a single unit; or the oven-defining structure and cover could be combined to form one unit while the base and the food-supporting device could be combined to form another unit.

What I claim is:
1. A cooking appliance comprising an inner electrically non-conductive tubular shell defining a cooking chamber and having an outer cylindrical surface, an outer electrically non-conductive tubular shell having an inner cylindrical surface which is coextensive and concentric with and which confronts said outer surface of said inner shell, a coating of electrically conductive material applied upon the mentioned surface of one of said shells, a first pair of electrically conductive annular bands overlying and carried by said surface of said one of said shells and disposed in conductive engagement with said coating at opposite marginal portions thereof, a second pair of electrically conductive annular bands overlying and carried by the mentioned surface of the other of said shells, one band of said second pair being arranged concentrically with respect to and encircling one band of said first pair, the other band of said second pair being arranged concentrically with respect to and encircling the other of said first pair, a series of circularly spaced contacts carried by each band of one pair and arranged in conductive engagement with the corresponding band of the other pair, conductors electrically coupled to said second pair of bands to supply electrical energy through said contacts and first pair of bands to said coating for radiating heat into said chamber, and means for supporting food within said chamber and in the field of radiated heat.

2. A cooking appliance as set forth in claim 1, in which the mentioned coating is applied upon the mentioned outer cylindrical surface of the mentioned inner shell.

3. A cooking appliance as set forth in claim 1, in which the mentioned contacts are carried by the bands of the mentioned second pair.

4. A cooking appliance as set forth in claim 1, in which the mentioned shells are arranged with a space between the mentioned outer surface of the inner shell and the mentioned inner surface of the outer shell, and in which the mentioned pairs of bands are disposed in said space.

5. A cooking appliance as set forth in claim 1, in which the mentioned shells are arranged with a space between the mentioned outer surface of the inner shell and the mentioned inner surface of the outer shell, and in which the mentioned pairs of bands and the mentioned conductors are disposed in said space.

References Cited in the file of this patent

UNITED STATES PATENTS

| | | |
|---|---|---|
| 1,817,351 | Cookson | Aug. 4, 1931 |
| 1,870,619 | Flanzer | Aug. 9, 1932 |
| 1,887,219 | Stranszky | Nov. 8, 1932 |
| 1,978,089 | Jones | Oct. 23, 1934 |
| 2,059,911 | Rebora | Nov. 3, 1936 |
| 2,445,120 | Levinson et al. | July 13, 1948 |
| 2,543,297 | Olmstead | Feb. 27, 1951 |
| 2,546,983 | Del Buttero | Apr. 3, 1951 |
| 2,564,987 | Mochel | Aug. 12, 1951 |
| 2,603,740 | Del Buttero | July 15, 1952 |
| 2,720,158 | Finizie | Oct. 11, 1955 |

FOREIGN PATENTS

| | | |
|---|---|---|
| 186,449 | Great Britain | Oct. 5, 1922 |
| 265,848 | Italy | July 9, 1929 |
| 791,716 | France | Oct. 7, 1935 |
| 451,383 | Great Britain | Aug. 5, 1936 |
| 635,124 | Great Britain | Apr. 5, 1950 |
| 331,403 | Switzerland | Aug. 30, 1958 |